US008839310B2

(12) United States Patent
Ramaswamy (10) Patent No.: US 8,839,310 B2
(45) Date of Patent: Sep. 16, 2014

(54) METHOD AND APPARATUS FOR IMPROVING RECEPTION OF WIRELESS SIGNALS USING SPARTIAL REDUNDANCY

(75) Inventor: Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 598 days.

(21) Appl. No.: 11/887,304

(22) PCT Filed: Oct. 17, 2005

(86) PCT No.: PCT/US2005/037056
§ 371 (c)(1),
(2), (4) Date: Sep. 27, 2007

(87) PCT Pub. No.: WO2006/104517
PCT Pub. Date: Oct. 5, 2006

(65) Prior Publication Data
US 2009/0276811 A1    Nov. 5, 2009

Related U.S. Application Data

(60) Provisional application No. 60/665,995, filed on Mar. 29, 2005.

(51) Int. Cl.
*H04N 7/16* (2011.01)
*H04N 7/20* (2006.01)

(52) U.S. Cl.
USPC ............... 725/62; 725/73; 725/144; 725/148

(58) Field of Classification Search
USPC ..................................... 725/1–153
See application file for complete search history.

(56) References Cited

U.S. PATENT DOCUMENTS

| 4,922,537 | A | 5/1990 | Frederiksen |
| 5,946,052 | A | 8/1999 | Ozkan et al. |
| 6,259,739 | B1 | 7/2001 | Kondo |
| 6,366,326 | B1 | 4/2002 | Ozkan et al. |
| 7,394,858 | B2 * | 7/2008 | Sadowsky et al. ............ 375/260 |

(Continued)

FOREIGN PATENT DOCUMENTS

| JP | 2003512787 | 4/2003 |
| JP | 2004312489 | 11/2004 |
| WO | WO0130085 | 4/2001 |

OTHER PUBLICATIONS

Byers, J W et al: "A Digital Fountain Approach to Reliable Distribution of Bulk Data", vol. 28, No. 4, Oct. 1998, pp. 56-67, XP000914424.

(Continued)

*Primary Examiner* — Gigi L Dubasky
(74) *Attorney, Agent, or Firm* — Robert D. Shedd; Joseph J. Opalach (57) ABSTRACT

Data for one, or more, services is encoded using a scalable channel code and divided for transmission over N transmitters such that reception by a receiver of at least M of the transmitted signals, where M<N, enables recovery of the data by the receiver. In other words, even if reception for any one particular transmitted signal in a defined geographical region is not guaranteed, reception of at least M of the other transmitted signals enables reception of the service(s). Thus, one, or more, services can be offered across an entire geographical area notwithstanding the existence of areas of poor, or no, reception.

14 Claims, 12 Drawing Sheets

(56) References Cited

U.S. PATENT DOCUMENTS

| | | | |
|---|---|---|---|
| 2003/0131303 A1* | 7/2003 | Kim et al. | 714/755 |
| 2003/0200499 A1* | 10/2003 | Khayrallah | 714/776 |
| 2004/0002364 A1 | 1/2004 | Trikkonen et al. | |
| 2004/0101274 A1* | 5/2004 | Foisy et al. | 386/46 |
| 2006/0069550 A1* | 3/2006 | Todd et al. | 704/212 |

OTHER PUBLICATIONS

Kawada, R et al: "Flat mulit-scalable coding for failure-free video transmission", vol. 3, Oct. 24, 1999, pp. 110-114, XP010368904.

Kuhn, M et al: "Linear scalable space-time codes: tradeoff between spatial multiplexing and transmit diversity", 2003 4th IEEE Workshop on Signal Processing Advances in Wireless Communications, Jun. 15, 2003, pp. 21-25, XP010713460.

Luby, M., "LT Codes", Digital Fountain, Inc., luby@digitalfountain.com, 10 pages, Dated 2002.

Shokrollahi, A., "Raptor Codes", Digital Fountain, Inc., Fremont, California and Laboratoire d'algorithmique, Switzerland, Jan. 13, 2004, pp. 1-35.

International Search Report, dated Feb. 6, 2006.

\* cited by examiner

METHOD AND APPARATUS FOR IMPROVING RECEPTION OF WIRELESS SIGNALS USING SPARTIAL REDUNDANCY

CROSS-REFERENCE TO RELATED APPLICATIONS

This application is a National Stage Application and claims the benefit, under 35 U.S.C. §365 of International Application PCT/US2005/037056 filed Oct. 17, 2005, which was published in accordance with PCT Article 21(2) on Oct. 5, 2006, in English and which claims the benefit of U.S. provisional Patent application No. 60/665,995, filed Mar. 29, 2005.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Figure 1:
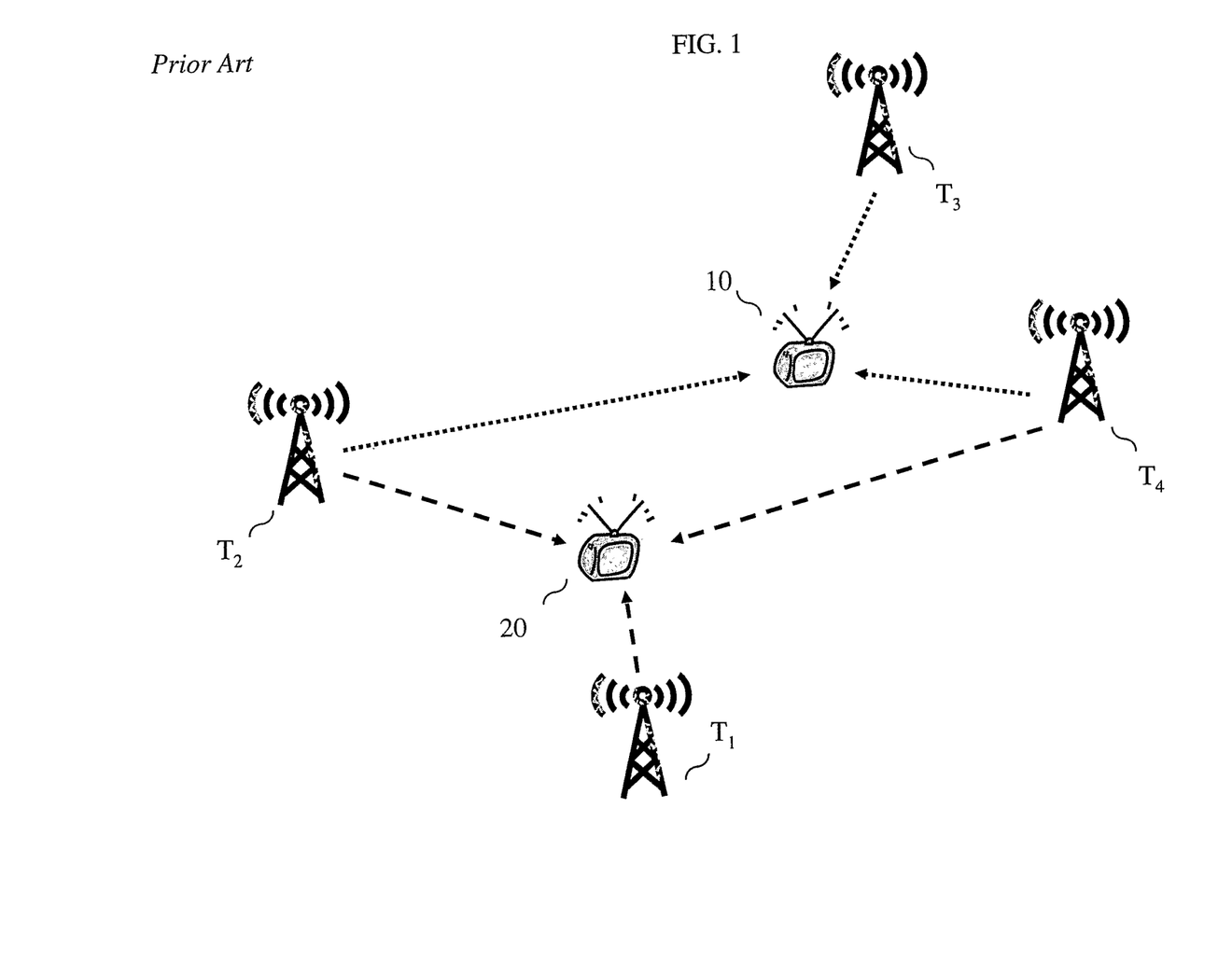
FIG. 1 illustrates reception problems in a terrestrial television broadcast areas.

In many wireless communications systems, the key problem is that a receiver may be able to receive the transmission of some of the channels (or signals) but not all of them. For example, in a terrestrial broadcast television (TV) system in the United States, a city may typically have 5 to 15 terrestrial transmitters that are geographically separated, each terrestrial transmitter broadcasting content on a particular channel (or channels). However, a TV set may only be able to receive a subset of the channels being broadcast in a given geographical area because of the geographical location of the TV set. Indeed, for a modern digital communication system like the ATSC-DTV (Advanced Television Systems Committee-Digital Television) system (e.g., see, United States Advanced Television Systems Committee, "ATSC Digital Television Standard", Document A/53, Sep. 16, 1995 and "Guide to the Use of the ATSC Digital Television Standard", Document A/54, Oct. 4, 1995), it is well known that the coverage for a given area varies depending on the location of the TV set. This is further illustrated in FIG. 1. A geographical area includes terrestrial ATSC-DTV transmission towers $T_1$, $T_2$, $T_3$ and $T_4$, for broadcasting content associated with channels 1, 2, 3 and 4, respectively. (For the purposes of this example, it is assumed that each transmission tower only broadcasts programming for a single channel.) In this geographical area, two TV sets, TV set 10 and TV set 20, are located. As illustrated in FIG. 1 by the dotted lines arrows, TV set 10 is only able to receive a subset of the available channels, i.e., channels 2, 3 and 4. Likewise, the dashed line arrows of FIG. 1 illustrate that TV set 20 is only able to receive channels 1, 2 and 4.

There is no solution today that can mitigate this problem.

Indeed, this problem also affects the offering of other services in a wireless network. As an illustration, again consider an ATSC-DTV system. Today, an ATSC-DTV system offers about 19 Mbits/sec (millions of bits per second) for transmission of an MPEG2-compressed HDTV (high definition TV) signal (MPEG2 refers to Moving Picture Expert Group (MPEG)-2 Systems Standard (ISO/IEC 13818-1)). As such, around four to six standard definition TV channels can be safely supported in a single physical transmission channel (PTC) without congestion. Additionally, enough bandwidth remains within this transport stream to provide several additional low-bandwidth non-conventional services, or auxiliary services, such as weather reports, stock indices, headline news, home shopping, etc. In fact, due to improvements in both MPEG2 encoding and the introduction of advanced codec (coder/decoder) technology (such as H.264 or VC1), even more additional spare capacity is becoming available in a PTC for use in offering auxiliary services.

However, the above-described problem inhibits the offering of a guaranteed class of service for these auxiliary services over a defined geographical region.

SUMMARY OF THE INVENTION

I have observed that there is an opportunity to aggregate the above-described spare capacity and offer a new coherent service that addresses the signal coverage problems in a defined geographical region. In particular, and in accordance with the principles of the invention, data for one, or more, services is encoded using a scalable channel code and divided for transmission over N transmitters such that reception by a receiver of at least M of the transmitted signals, where M<N, enables recovery of the data by the receiver. In other words, even if reception for one, or more, particular transmitted signals in a defined geographical region are not guaranteed, reception of at least M of the other transmitted signals enables reception of the service(s). Thus, one, or more, services can be offered across an entire geographical area notwithstanding the existence of areas of poor, or no, reception.

In an embodiment of the invention, an ATSC-DTV transmitter for a TV provider transmits a digital multiplex that includes a primary channel and an auxiliary channel. The primary channel includes one or more high definition TV (HDTV) channels offered by the TV provider; while the auxiliary channel includes a portion of a fountain-coded data stream. Other portions of the fountain-coded data stream are transmitted by other ATSC-DTV transmitters.

In another embodiment of the invention, an ATSC-DTV receiver comprises M tuners, where M>1, and a fountain decoder. Each tuner is tuned to a different PTC and recovers therefrom a fountain-coded data stream. The M recovered fountain-coded data streams are applied to the fountain decoder to provide a data stream, which represent one, or more, services.

In another embodiment of the invention, program content is embodied in a data-bearing signal comprising at least one carrier wave, the data bearing signal representing a plurality of packets, wherein at least some of these packets represent a portion of a fountain-coded data stream.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as eight-level vestigial sideband (8-VSB), Quadrature Amplitude Modulation (QAM), scalable channel coding (e.g., fountain coding/decoding) and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 2:
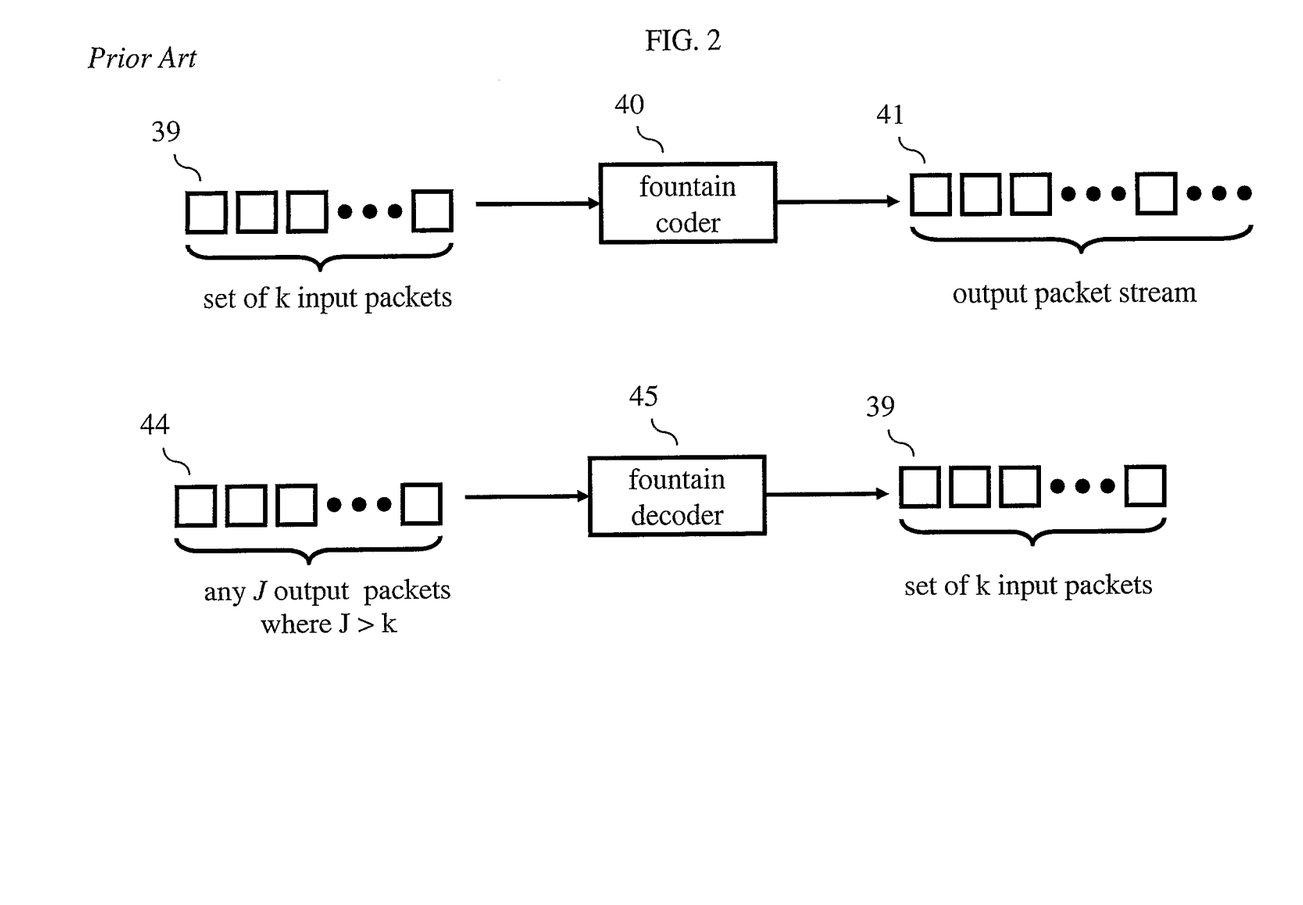
FIG. 2 conceptually illustrates fountain coding/decoding.

As noted above, the inventive concept relates to an application of scalable channel coding. An illustration of scalable channel coding is a fountain code. Referring now to FIG. 2, a conceptual illustration of a fountain coding system is shown. Other than the inventive concept, fountain codes are known in the art. Fountain codes include LT codes (e.g., see "LT Codes," in the Proceedings of ACM Symposium on Foundations of computer Science, 2002) and Raptor codes (e.g., see "Raptor Codes," by Amin Shokrollahi, Published Report—Digital Fountain Inc. and Laboratorie d'Algorithmique, EPLF, Lausanne, Switzerland, Jan. 13, 2004).

Turning first to the upper portion of FIG. 2, a file of length N is partitioned into k=N/L input packets, where L is the payload of each input packet (also referred to herein as the input symbol). It should be noted that the term "packet" as used herein is conventional, i.e., a packet also includes addressing information, error detection/correction data (e.g., a parity and/or a cyclic redundancy check (CRC) code, etc.), etc., as known in the art and is not described further herein. An illustrative set of k input packets, 39, is applied to fountain coder 40. The latter randomly generates output packets (also referred to herein as output symbols) to produce a fountain-coded output packet stream 41. For example, each output packet of fountain coder 40 is generated independently and randomly as the exclusive-or (XOR) of some of the input packets. As such, the encoding process defines an encoding graph (not shown) connecting output symbols to input symbols. While some of the output packets of output packet stream 41 may be lost in transmission or corrupted, an advantage of using fountain-coded data is that recovery of any J output packets enables recovery of the original set of k input packets. This is illustrated in the lower portion of FIG. 2. Fountain decoder 45 receives any J output packets, 44, of the output packet stream 41. As soon as J output packets are received, fountain decoder 45 decodes these packets and reproduces the original set of k input packets 39. In this example, it is assumed that fountain decoder 45 includes the above-mentioned encoding graph, i.e., fountain decoder 45 knows which input symbols are used to generate a particular output symbol. While J>k, advantageously, the value of J can be very close to the value of k, e.g., J=1.05(k).

As described earlier, I have observed that it is possible to offer a new coherent service that addresses signal coverage problems in a defined geographical region. It should be noted that the actual type of service (weather, stock data etc.) is irrelevant to the inventive concept. In particular, and in accordance with the principles of the invention, data for one, or more, services is encoded using a scalable channel code and divided for transmission over N transmitters such that reception by a receiver of at least M of the transmitted signals, where M<N, enables recovery of the data by the receiver. In other words, even if reception for any one particular transmitted signal in a defined geographical region is not guaranteed, reception of at least M of the other transmitted signals enables reception of the service(s). Thus, one, or more, services can be offered across an entire geographical area notwithstanding the existence of areas of poor, or no, reception.

In view of the above, a wireless system can provide improved coverage for a geographical area. If one assumes that there are N transmitters in a city, it is likely that (N−k; k>0), are reliably received by over 90% of the receivers in the field. For example, in the context of the ATSC-DTV system of FIG. 1, if the providers agree to share any spare capacity, then this spare capacity is allocated to the above-described service, which is encoded using a scalable channel code. For example, if 3 Mbits/sec of spare capacity is available on a PTC for use as an auxiliary channel, each station may choose to share a portion or all of the 3 Mbit/sec (whether this is a constant bit rate or variable bit rate with 3 Mbit/sec being the average is up to the individual channels) on a reciprocal basis with three other stations ($T_1$, $T_2$ and $T_3$). It should be noted that spare capacity in a PTC can be created by restricting transmission of primary channels, e.g., selecting the number of primary channels such that the requisite amount of spare capacity is created in the PTC. An extreme example is the transmission of only one primary channel, i.e., a signal digital ATSC-DTV channel. Alternatively, advantage can be taken of improvements in both MPEG2 encoding and the introduction of advanced codec (coder/decoder) technology (such as H.264, which is also known as AVC (Advanced Video Coding) or MPEG-4 Part 10 or VC1) to create spare capacity in a PTC.

Figure 3:
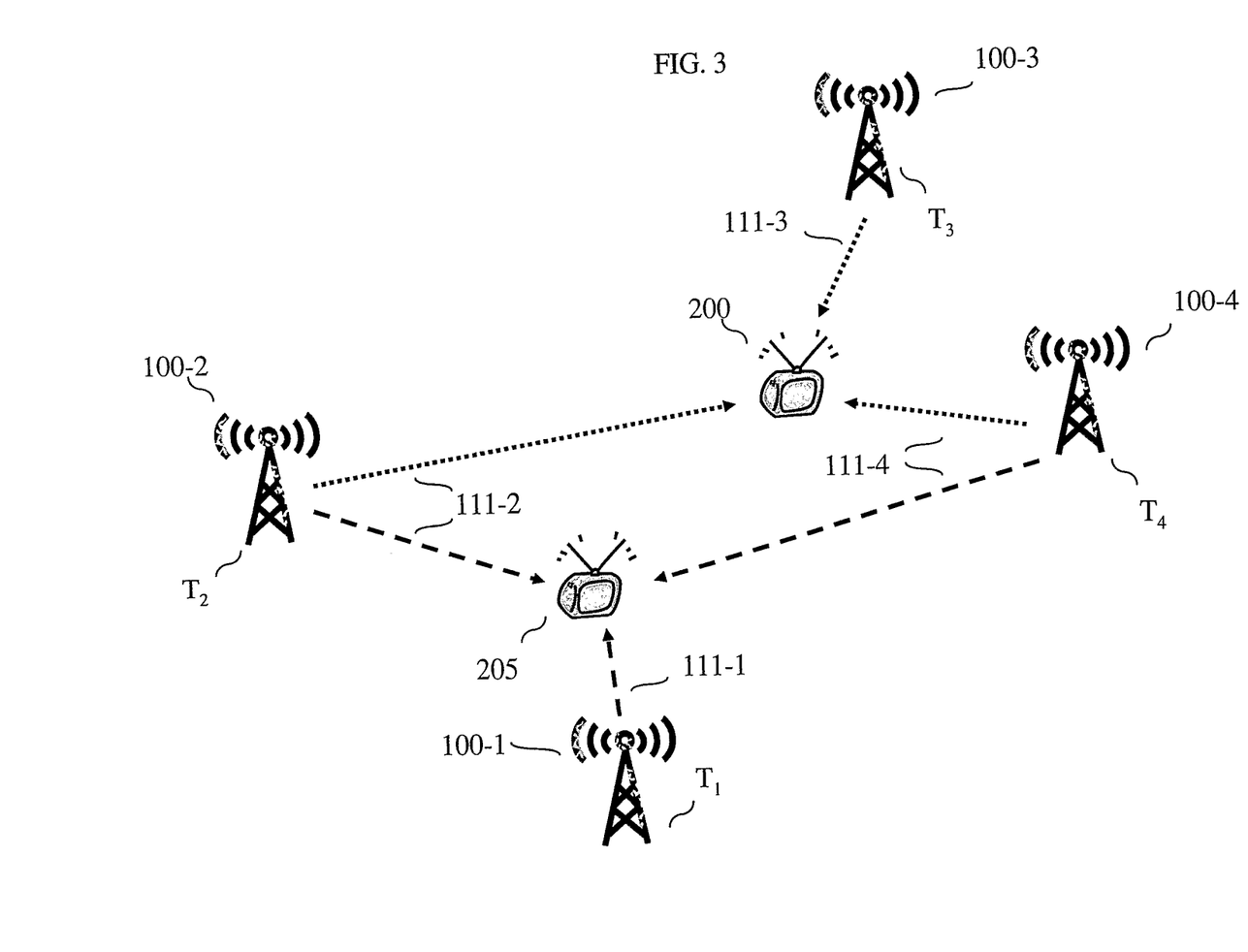
FIG. 3 illustrates terrestrial broadcast in accordance with the principles of the invention.

An illustrative arrangement for ATSC-DTV terrestrial broadcast in accordance with the principles of the invention is shown in FIG. 3. This figure is similar to FIG. 1 except that each of the transmission towers shown in FIG. 3 transmits a signal in accordance with the principles of the invention (described below). In this example, a transmitter 100-1 is associated with transmission tower $T_1$ for transmitting a signal 111-1, a transmitter 100-2 is associated with transmission tower $T_2$ for transmitting a signal 111-2, a transmitter 100-3 is associated with transmission tower $T_3$ for transmitting a signal 111-3 and a transmitter 100-4 is associated with transmission tower $T_4$ for transmitting a signal 111-4. Similarly, receivers, as represented by TV sets 200 and 205, are adapted, in accordance with the principles of the invention, to take advantage of the transmitted signal to provide for robust reception of one, or more, services. As can be observed from the dotted arrows of FIG. 3, TV set 200 is only able to receive a subset of the available channels, i.e., channels 2, 3 and 4. Reception for channel 1 is either too poor or nonexistent. Likewise, the dashed line arrows of FIG. 3 illustrate that TV set 205 is only able to receive channels 1, 2 and 4 for effective viewing of the content therein. TV set 205 is similar to TV set 200 (described below) and is not described further herein. For the purposes of this example, each transmission tower is illustratively associated with a particular TV provider, which transmits programming on a single channel. For example, transmission tower $T_1$ broadcasts programming for channel 1.1, transmission tower $T_2$ broadcasts programming for channel 2.1, transmission tower $T_3$ broadcasts programming for channel 3.1 and transmission tower $T_4$ broadcasts programming for channel 4.1, where each channel number uses the ATSC major-minor channel number format as known in the art. However, the invention is not so limited. For example, transmission tower $T_1$ may broadcast programming for more than one channel, e.g., channels 1.1, 1.2, etc. Similarly, a transmission tower may not be associated with a particular TV provider.

Figure 4:
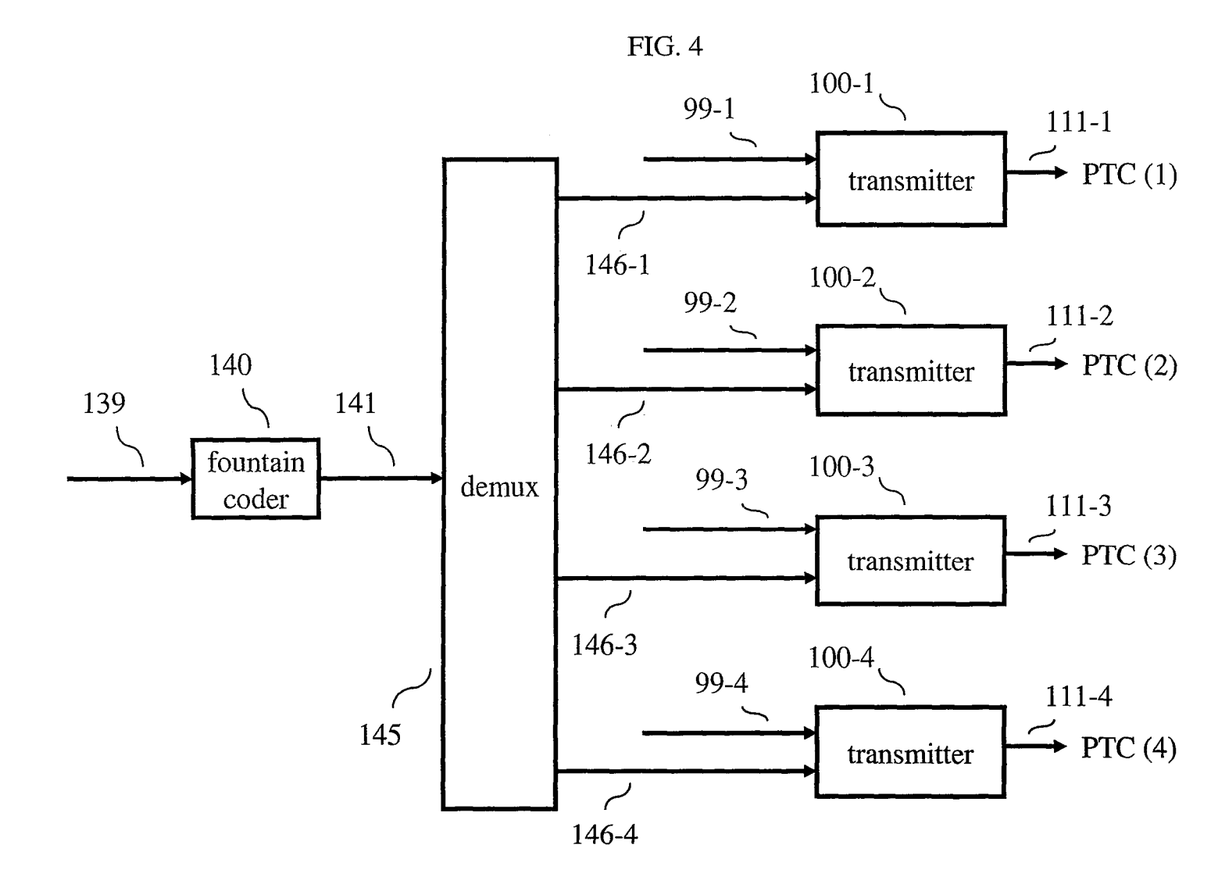
FIG. 4 shows an illustrative block diagram of a transmitting arrangement embodying the principles of the invention.

Turning now to FIG. 4, an illustrative embodiment of a transmitting arrangement is shown. The transmitting arrangement comprises fountain coder 140 (illustrative of scalable channel coding), demultiplexer (demux) 145 and transmitters 100-1, 100-2, 100-3 and 100-4. It should be noted that the various elements shown in FIG. 4 may not be geographically co-located. Other than the inventive concept, transmitters 100-1, 100-2, 100-3 and 100-4 form respective ATSC-DTV signals for transmission via the associated transmission towers as known in the art. A data stream 139 is applied to fountain coder 140. Data stream 139 represents data for one, or more, services. In the context of the ATSC-DTV system of FIG. 3, these are referred to as auxiliary services as opposed to the primary service, which is transmission of an HDTV signal, but the invention is not so limited. Fountain coder 140 encodes the applied data and provided fountain-coded bit stream 141 to demux 145. The latter divides the fountain-coded data stream among the four transmitters. Each transmitter receives a portion of the fountain-coded data stream and non-fountain coded data (e.g., a programming guide and one, or more, HDTV channels) for transmission as an ATSC-DTV signal. In particular, transmitter 100-1 receives fountain-coded data portion 146-1 and non-fountain-coded data 99-1, which is transmitted, via transmission tower $T_1$, via signal 111-1. Other than the inventive concept, signal 111-1 represents physical transmission channel (PTC) 1, which is a transport stream or digital multiplex conveyed at an appropriate carrier frequency, as know in the art. Likewise, transmitter 100-2 receives fountain-coded data portion 146-2 and non-fountain-coded data 99-2, which is transmitted, via transmission tower $T_2$, via signal 111-2; transmitter 100-3 receives fountain-coded data portion 146-3 and non-fountain-coded data 99-3, which is transmitted, via transmission tower $T_3$, via signal 111-3 and transmitter 100-4 receives fountain-coded data portion 146-4 and non-fountain-coded data 99-4, which is transmitted, via transmission tower $T_4$, via signal 111-4.

Figure 5:
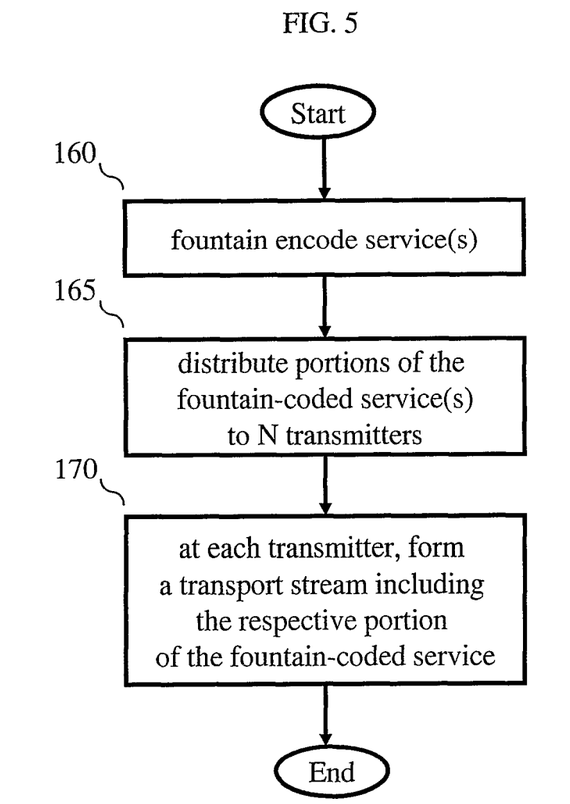
FIG. 5 shows an illustrative flow chart in accordance with the principles of the invention for use in the transmitting arrangement of FIG. 4.

Reference at this time should also be made to FIG. 5, which shows an illustrative flowchart in accordance with the principles of the invention for use in the transmitting arrangement of FIG. 4. In accordance with the principles of the invention, data representing one, or more, services is fountain encoded in step 160. In step, 165, the fountain-encoded data is distributed to N transmitters, N>1, such that each transmitter receives a portion of the fountain-coded service. Finally, in step 170, each of the N transmitters forms a transport stream, or digital multiplex for transmission, wherein the transport stream includes its portion of the fountain-coded service. As such, the fountain-coded service is distributed among the N transmitters for transmission. It should be noted that although the inventive concept has been described in the context of a uniform distribution of the fountain-coded data, i.e., the portions are equal, the inventive concept is not so limited.

Figure 6:
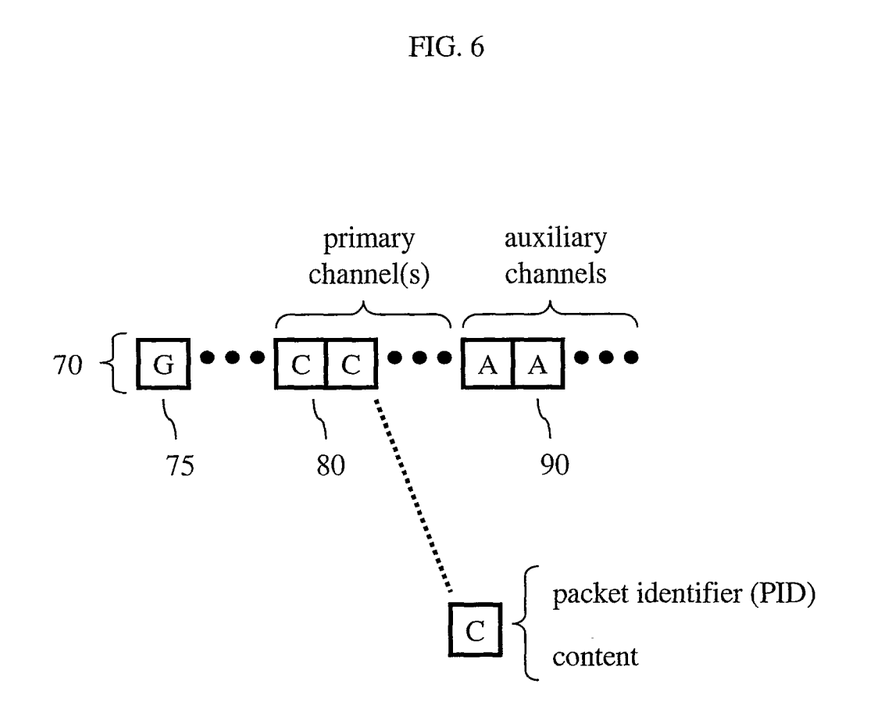
FIG. 6 shows a portion of an illustrative signal format in accordance with the principles of the invention.

Turning now to FIG. 6, an illustrative format for a PTC in accordance with the principles of the invention is shown in the context of the transmitting arrangement of FIGS. 3 and 4. Each PTC (111-1, 111-2, 111-3 and 111-4) represents a data-bearing signal comprising at least one carrier wave (not shown), the data bearing signal representing a plurality of packets, wherein at least some of these packets represent a portion of a fountain-coded data stream. In particular, each PTC represents a stream of packets 70. In the context of an ATSC-DTV system, the stream of packets includes at least one Master Programming Guide (MPG) (G) packet 75, at least one content (C) packet 80 and at least one auxiliary packet (A) packet 90. Other than the inventive concept, an MPG is known in the art (e.g., see "ATSC Standard: Program and System Information Protocol for Terrestrial Broadcast and Cable (Revision B)," Doc. A/65B, Advance Television Systems Committee, which, as such, is not described herein). The MPG includes data, or information, for each of the PTCs. The data associated with each PTC includes modulation format, etc., and data related to each of the programs channels that are a part of a particular PTC. In addition, and in accordance with the principles of the invention, the MPG would include auxiliary program channel information, which includes program data and PID data similar to that found for each of the program channels except that these relate to packets conveying the services. Each content packet 80 comprises a packet identifier (PID) and content (video, audio and/or data). For example, the content could relate to video and/or audio for a particular program channel (e.g., HDTV signals), or even data representing an executable program being downloaded to receiver 300. In accordance with the principles of the invention, an auxiliary packet 90 represents a portion of fountain-coded data. For example in the contest of transmitter 100-1, auxiliary channel 90 conveys fountain-coded data portion 146-1. However, the invention it no so limited and other non-fountain coded data can also be conveyed via the auxiliary channel as well.

Figure 7:
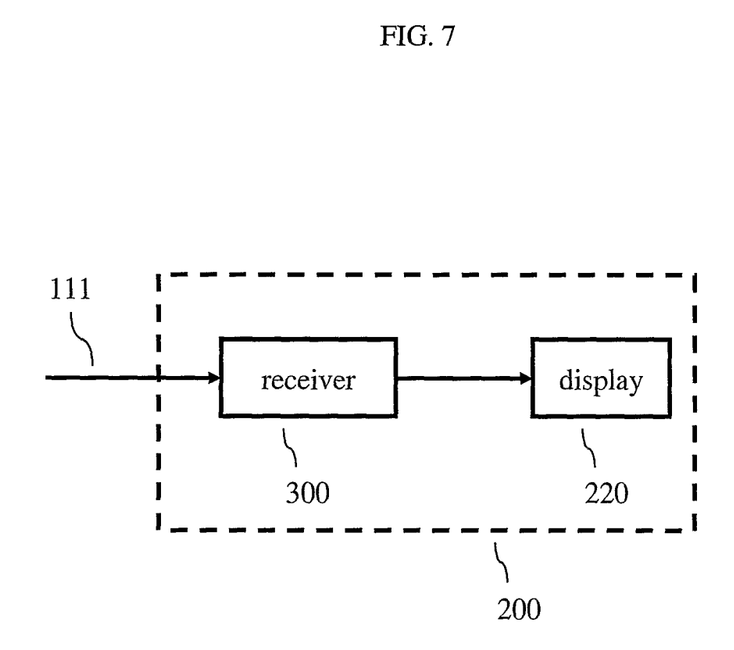
FIG. 7 shows an illustrative high-level block diagram of a receiver embodying the principles of the invention.

A high-level block diagram of an illustrative TV set 200 in accordance with the principles of the invention is shown in FIG. 7. TV set 200 includes a receiver 300 and a display 220. Illustratively, receiver 300 is an ATSC-compatible receiver. It should be noted that receiver 300 may also be NTSC (National Television Systems Committee)-compatible, i.e., have an NTSC mode of operation and an ATSC mode of operation such that TV set 200 is capable of displaying video content from an NTSC broadcast or an ATSC broadcast. For simplicity in describing the inventive concept, only the ATSC mode of operation is described herein. Receiver 300 receives broadcast signals 111 (e.g., via an antenna (not shown)) for processing to recover therefrom, e.g., an HDTV (high definition TV) video signal for application to display 220 for viewing video content thereon.

Figure 8:
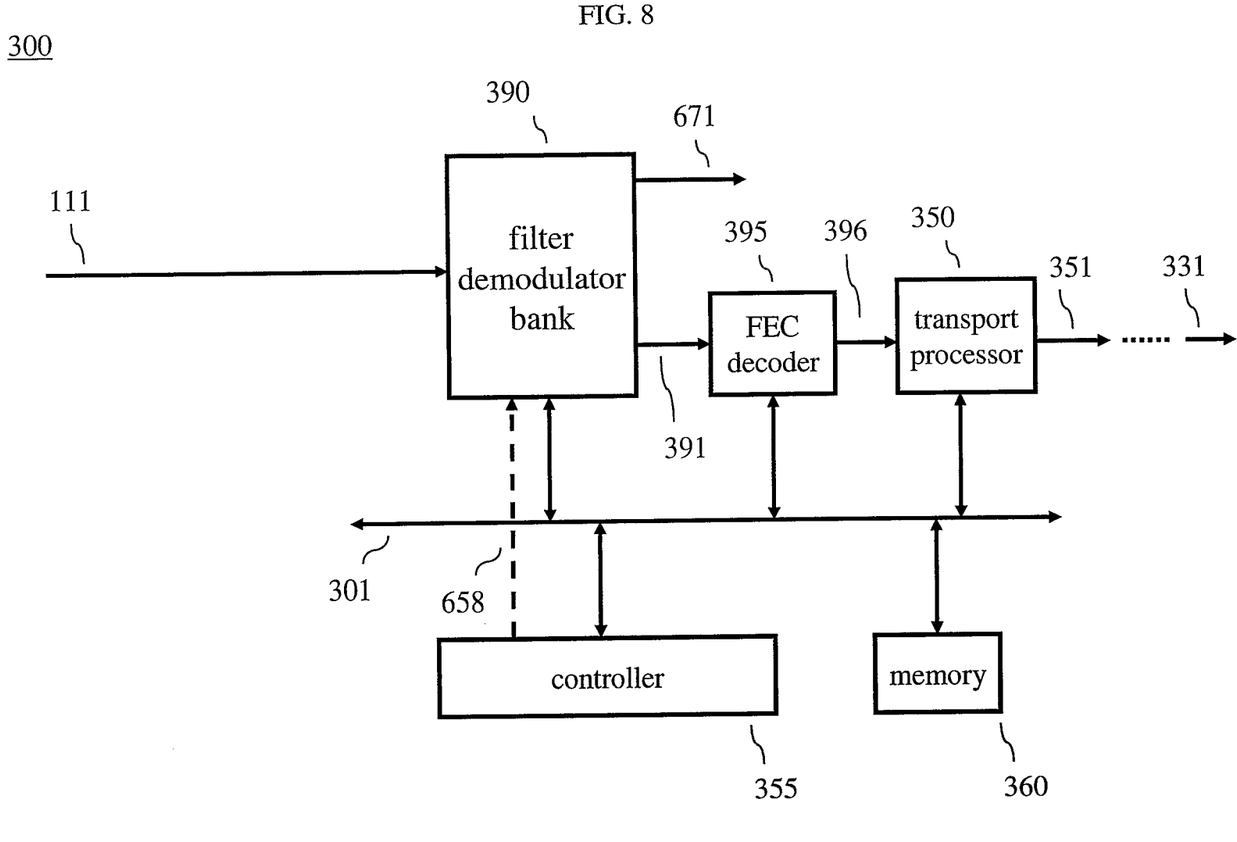
FIGS. 8 and 9 show illustrative portions of a receiver embodying the principles of the invention.

In accordance with the principles of the invention, receiver 300 is also able to recover one, or more, services even if the reception for a selected channel is either too poor or nonexistent. Turning now to receiver 300, an illustrative portion of receiver 300 in accordance with the principles of the invention is shown in FIG. 8. Receiver 300 includes filter demodulator bank 390, forward error correction (FEC) decoder 395, transport processor 350, controller 355 and memory 360. Both transport processor 350 and controller 355 are each representative of one or more microprocessors and/or digital signal processors (DSPs) and may include memory for executing programs and storing data. In this regard, memory 360 is representative of memory in receiver 300 and includes, e.g., any memory of transport processor 350 and/or controller 355. An illustrative bidirectional data and control bus 301 couples various ones of the elements of FIG. 8 together as shown. Control bus 301 is merely representative, e.g., individual signals (in a parallel and/or serial form) may be used, etc., for conveying data and control signaling between the elements of FIG. 8. It should also be noted that receiver 300 may receive commands, e.g., program selection, via a remote control (not shown).

In accordance with the principles of the invention, as noted earlier, it is assumed that signals from at least (N−k) transmitters can be received at any point with a defined geographical region, where k>0. In the context of FIG. 3, the coverage area is represented by dashed and dotted lines and a receiver can always at least receive signals from three transmitters, i.e., N=4, and (N−k)=3, or k=1. As such, in the most general case, a receiver must be able to be tuned to the number of channels it needs to derive bits from, i.e., a receiver needs to have (N−k) tuners. In the context of FIG. 3, receiver 300 includes three tuners.

Figure 9:
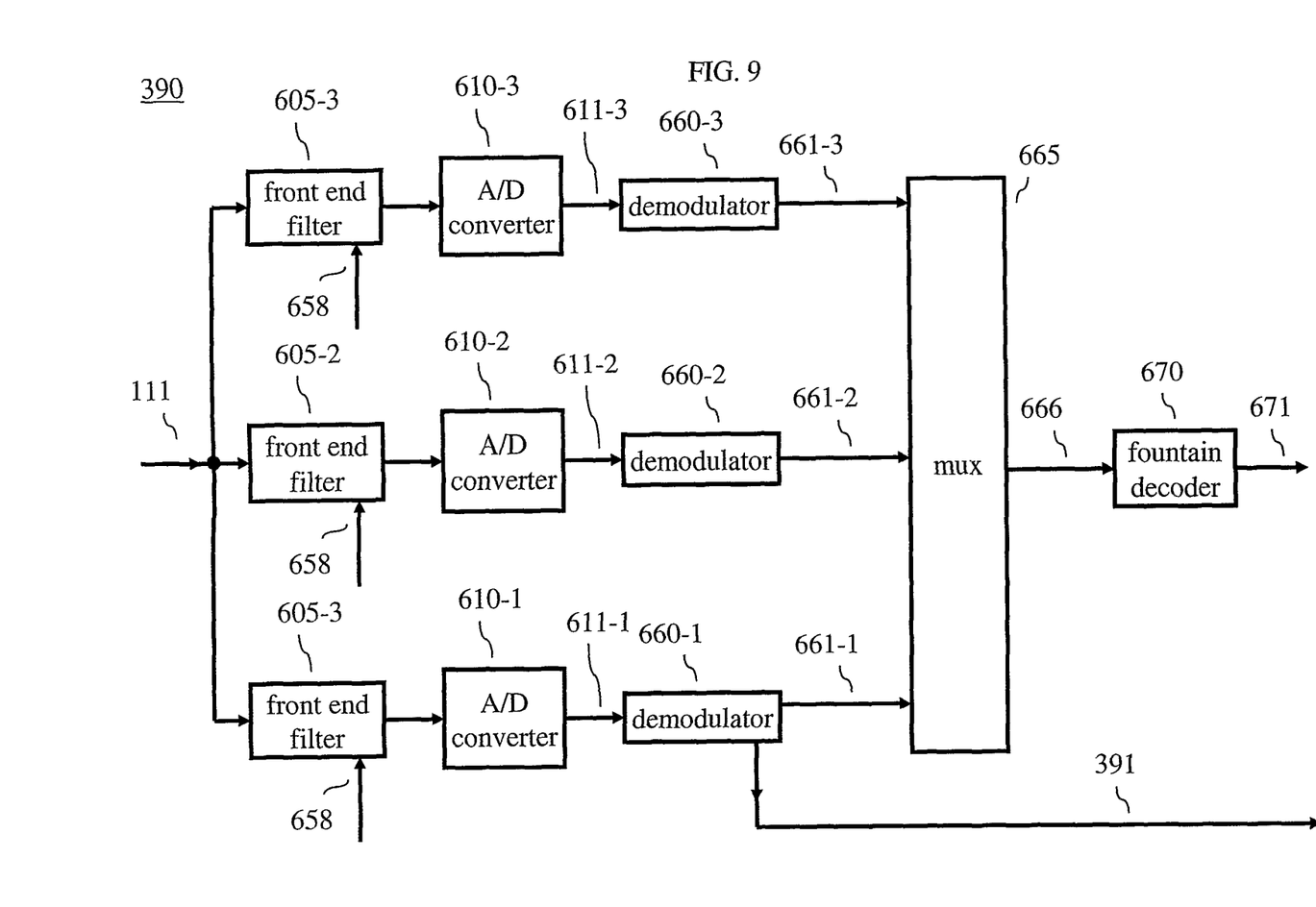

Referring now to FIG. 9, filter demodulator bank 390 is shown. Filter demodulator bank 390 includes three front-end filters (605-1, 605-2 and 605-3), three analog-to-digital (A/D) converters (610-1, 610-2 and 610-3), three demodulators (660-1, 660-2 and 660-3), a multiplexer (mux) 665 and fountain decoder 670 (illustrative of a scalable channel decoder). A received signal 111 is applied to filter demodulator bank 390. The received signal 111 is representative of all of the received signals being picked up by an antenna (not shown) of receiver 300. Front-end filter 605-3 is tuned by controller 355 of FIG. 8, via signal 658 of control bus 301, to the respective carrier frequency associated with one of the transmitters, e.g., transmitter 100-2. Likewise, front-end filter 605-2 is tuned to transmitter 100-3 and front-end filter 605-1 is tuned to transmitter 100-4. As such, each front-end filter down-converts and filters received signal 111 to provide a near base-band signal of the respective PTC to an A/D converter 610 (i.e., 610-1, 610-2 and 610-3), which samples the down converted signal to convert the signal to the digital domain and provide a sequence of samples 611 (i.e., 611-1, 611-2 and 611-3) to a demodulator 660 (i.e., 660-1, 660-2 and 660-3). Each demodulator performs demodulation of its respective applied signal and provides a demodulated signal 661 (i.e., 661-1, 661-2 and 661-3). The demodulated signals 661-1, 661-2 and 661-3 represent the recovery by the respective demodulator of the received portions of the scalable channel encoded data. These received portions of the scalable channel encoded data are applied to mux 665, which forms a received scalable channel encoded (e.g., a fountain-coded) data stream 666. The latter is applied to scalable channel decoder (e.g., fountain decoder) 670, which performs a complementary function to that of fountain coder 140 of FIG. 4 for decoding fountain-coded data stream 666 to provide decoded data stream 671, which, and in accordance with the principles of the invention, represents one, or more, services. Decoded data stream 671 is processed by other circuitry (not shown) of receiver 300 for providing the service(s) for use by a user.

In this regard, it should also be noted that at least one of the demodulators, e.g., demodulator 660-1 of FIG. 9 also provides a demodulated signal 391. The latter represents the non-fountain coded data of a particular PTC and, as such, is processed as known in the art, e.g., for viewing a selected HDTV program. In particular, demodulated signal 391 is applied to FEC decoder 395, which provides a decoded signal 396 to transport processor 350, which distributes video, audio and data bits as represented by content signal 351 to appropriate subsequent circuitry (not shown). In this regard, receiver 300 may additionally process signals 351 and 671 before application to display 220 and/or directly provide the content to display 220, via signal 331.

Figure 10:
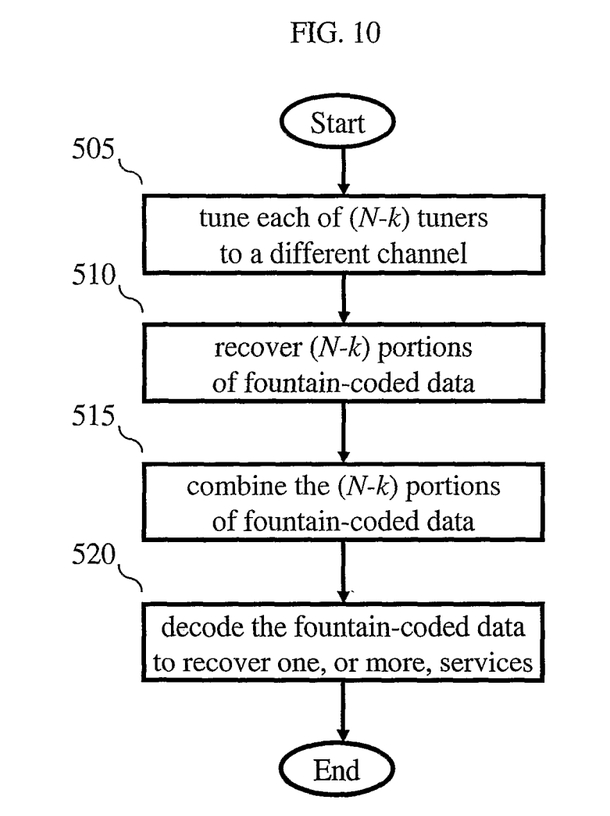
FIG. 10 shows an illustrative flow chart for use in a receiver in accordance with the principles of the invention.

Attention should now be directed to FIG. 10, which shows an illustrative flow chart for providing for a more robust reception of wireless signals in a receiver in accordance with the principles of the invention. In step 505, a receiver (e.g., controller 355 of receiver 300) tunes each of (N−k) tuners to received a different channel, where N>k>0. In step 510, the receiver (e.g., filter demodulator bank 390 of receiver 300) recovers N−k portions of fountain-coded data. In step 515, the receiver (e.g., mux 665 of receiver 300) combines the (N−k) portions of fountain-coded data to provide a stream of fountain-coded data. In step 520, the receiver (e.g., fountain decoder 670 of receiver 300) decodes the fountain-coded data to provide data representing one, or more services.

It should be noted that prior to step 505, the receiver may additionally perform a scan to determine the number of channels that can be effectively received. If at least (N−k) of the channels can be received, then the receiver allocates each of (N−k) tuners to a respective one of the (N−k) channels (step 505 of FIG. 10). Adequate reception can be determined by, e.g., evaluating a received signal strength indicator (RSSI) for the received channel. If (N−k) channels cannot be received then a suitable error message is generated. Again, as an example consider an ATSC-DTV system, it is assumed that receiver 300 has already received a form of the above-described MPG via at least one PTC. Other than the inventive concept, use of an MPG by a receiver to tune to channels therein is known in the art. For example, see U.S. Pat. No. 6,366,326 issued Apr. 2, 2002 to Ozkan et al. and/or U.S. Pat. No. 5,946,052 issued Aug. 31, 1999 issued to Ozkan et al. As such, searching for, and acquisition of, an MPG is not described herein. Once the MPG is acquired, receiver 300 can initially scan through each PTC listed in the MPG to determine, in the context of FIG. 3, if at least three PTCs can be adequately received for recovery of the fountain-coded service(s).

A described above, and in accordance with the inventive concept, a robust transmission and reception method is described for a system having multiple originating sources and multiple destinations (receivers or sinks). Indeed, the above-described inventive concept can be described as a form of spatial diversity. For example, in the illustrative embodiment above, the ATSC-DTV system of FIG. 3 incorporated spatial diversity in accordance with the principles of the invention. Illustratively, the inventive concept proposes the use of a scalable or rateless channel coding scheme such as the above-mentioned fountain codes across the content in the various channels. This scheme can be overlaid over the existing modulation formats (as illustrated in the above-described ATSC-DTV system). The redundancy required to accomplish this is a function of the expected coverage area expectations in relationship to the positioning of the existing transmitters.

Figure 11:
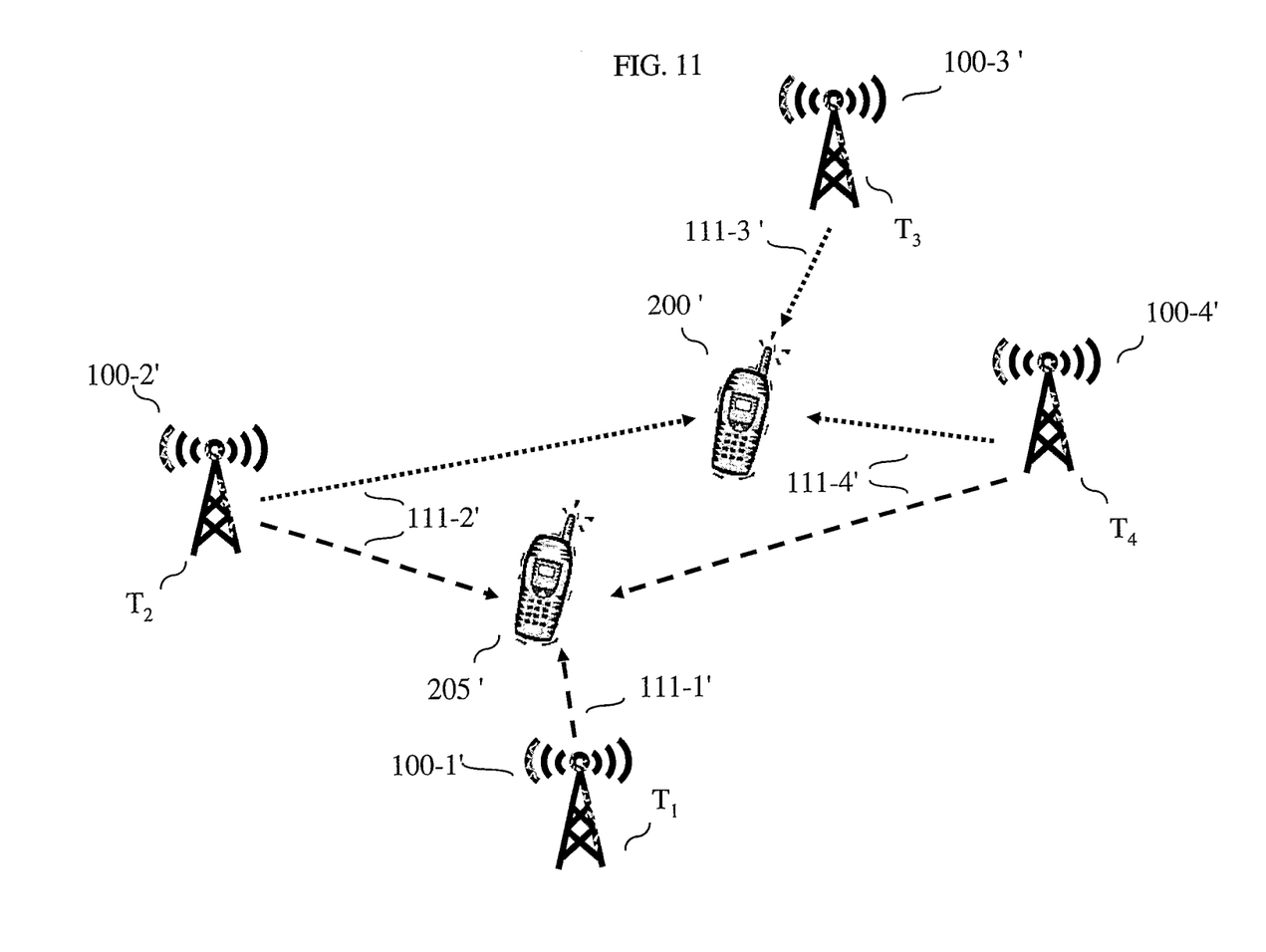
FIGS. 11 and 12 show other illustrative embodiments in accordance with the principles of the invention.
Figure 12:
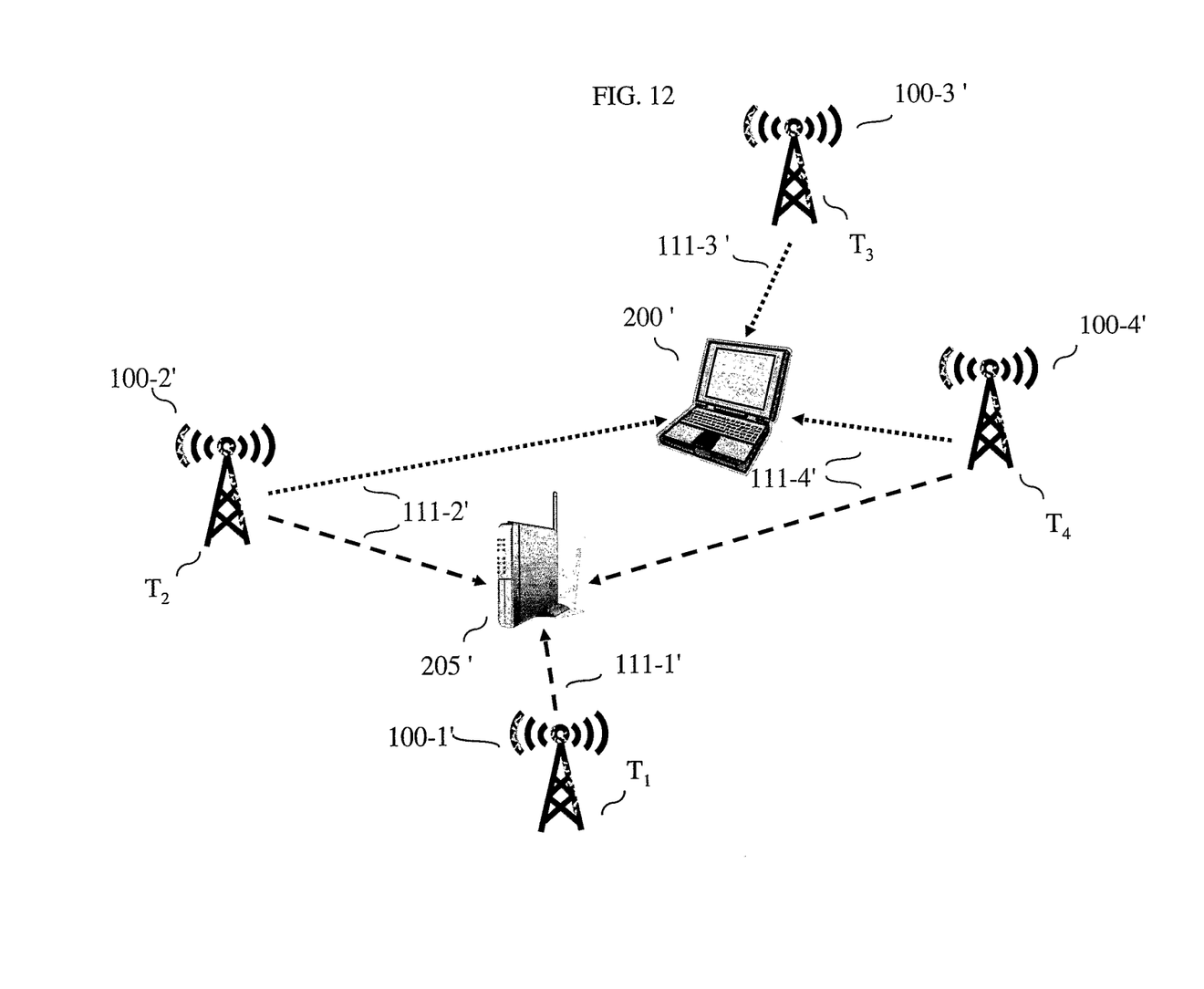

Turning now to FIGS. 11 and 12, other illustrative embodiments are shown in accordance with the principles of the invention. FIG. 11 is similar to the arrangement shown in FIG. 3, above, and illustrates application of the inventive concept to a cellular network, e.g., a Code Division Multiple Access (CDMA)-type system. In this example, cellular transmitters are adapted in accordance with the principles of the invention (described above) for transmission of one, or more, services. A transmitter 100-1' is associated with transmission tower $T_1$ for transmitting a cellular signal 111-1', a transmitter 100-2' is associated with transmission tower $T_2$ for transmitting a cellular signal 111-2', a transmitter 100-3' is associated with transmission tower $T_3$ for transmitting a cellular signal 111-3' and a transmitter 100-4' is associated with transmission tower $T_4$ for transmitting a cellular signal 111-4'. Similarly, receivers, as represented by cellular endpoints 200' and 205', are adapted, in accordance with the principles of the invention, to take advantage of the transmitted signal to provide for robust reception of one, or more, services.

Referring now to FIG. 12, this figure is also similar to the arrangement shown in FIG. 3, above, and illustrates application of the inventive concept to a Wi-Fi network, e.g., an 802.11-type system. In this example, Wi-Fi transmitters are adapted in accordance with the principles of the invention (described above) for transmission of one, or more, services. A transmitter 100-1' is associated with transmission tower $T_1$ for transmitting a Wi-Fi signal 111-1', a transmitter 100-2' is associated with transmission tower $T_2$ for transmitting a Wi-Fi signal 111-2', a transmitter 100-3' is associated with transmission tower $T_3$ for transmitting a Wi-Fi signal 111-3' and a transmitter 100-4' is associated with transmission tower $T_4$ for transmitting a Wi-Fi signal 111-4'. Similarly, receivers, as represented by Wi-Fi endpoints 200' (e.g., a laptop computer) and 205', are adapted, in accordance with the principles of the invention, to take advantage of the transmitted signal to provide for robust reception of one, or more, services. It should be observed that Wi-Fi endpoint 205' is representative of a hub and/or router, for routing (distributing) the service to other endpoints of a network (or sub-network) (not shown).

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown in, e.g., FIGS. 5 and/or 10, etc. Further, although shown as elements bundled within TV set 200, the elements therein may be distributed in different units in any combination thereof. For example, receiver 300 of FIG. 7 may be a part of a device, or box, such as a set-top box that is physically separate from the device, or box, incorporating display 220, etc. Also, it should be noted that although described in the context of terrestrial broadcast (e.g., ATSC-DTV), the principles of the invention are applicable to other types of communications systems, e.g., satellite, Wi-Fi, cellular, etc. Indeed, even though the inventive concept was illustrated in the context of stationary receivers, the inventive concept is also applicable to mobile receivers. It is therefore to be understood that numerous modifications may be made to the illustrative embodiments and that other arrangements may be devised without departing from the spirit and scope of the present invention as defined by the appended claims.

The invention claimed is:

1. A wireless transmitting system comprising:
a fountain coder for fountain encoding a data stream;
a demultiplexer for demultiplexing the fountain encoded data stream into N different portions, where N>1; and
N transmitters, each transmitter for wirelessly broadcasting a respective digital multiplex, each respective digital multiplex including a primary channel and an auxiliary channel, the auxiliary channel including a respective one of the N different portions of the fountain encoded data stream, the primary channel including one or more non-fountain coded data streams,
wherein:
the N transmitters are geographically separated, and
the fountain encoded data stream can be recovered using M different portions of the fountain encoded data stream to enable reception of a service, where M<N.

2. The system of claim 1, wherein the primary channel includes one, or more, high resolution video channels.

3. The system of claim 1, wherein the primary channel represents an ATSC-DTV (Advanced Television Systems Committee-Digital Television) signal.

4. A wireless receiver comprising:
M tuners for use in wirelessly receiving M of N respective different transport streams, each of the N respective different transport streams including a primary channel and an auxiliary channel, being transmitted from one of N geographically separated transmitters, and providing a respective one of N different portions of a fountain encoded data stream representing the auxiliary channel and one or more non-fountain coded data streams representing the primary channel, where N>M>1;
a fountain decoder for use in decoding M of N different portions of the fountain encoded data stream to provide a decoded data stream enabling reception of a service; and
a controller for tuning at least one of the M tuners for recovery of the one or more non-fountain coded data streams representing the primary channel.

5. The receiver of claim 4, wherein the primary channel conveys at least one high definition TV (HDTV) channel.

6. The receiver of claim 5, wherein the primary channel represents an ATSC-DTV (Advanced Television Systems Committee-Digital Television) signal.

7. The receiver of claim 4 comprising:
a multiplexer for combining the M of N different portions of the fountain encoded data stream to provide the fountain encoded data stream, wherein the fountain decoder decodes the fountain encoded data stream to provide the decoded data stream.

8. A method for use in a wireless transmitting system comprising:
fountain encoding a data stream;
demultiplexing the fountain encoded data stream into N different portions, where N>1, and
wirelessly broadcasting from each of N transmitters a respective different digital multiplex, each respective different digital multiplex including a primary channel and an auxiliary channel, the auxiliary channel including a respective one of the N different portions of the fountain encoded data stream, the primary channel including one or more non-fountain coded data streams,
wherein:
the N transmitters are geographically separated, and
the fountain encoded data stream can be recovered using M different portions of the fountain encoded data stream to enable reception of a service, where M<N.

9. The method of claim 8, wherein the primary channel includes one, or more, high resolution video channels.

10. The method of claim 9, wherein the primary channel represents an ATSC-DTV (Advanced Television Systems Committee-Digital Television) signal.

11. A method for use in a wireless receiver, the method comprising:
for wirelessly receiving a primary channel, tuning one of M tuners for providing a non-fountain coded data stream representing the primary channel;
for wirelessly receiving an auxiliary channel, tuning M tuners to receive M of N respective different transport streams, each of the N respective different transport streams including the primary channel and the auxiliary channel, being transmitted from one of N geographically separated transmitters, and providing a respective one of N different portions of a fountain encoded data stream representing the auxiliary channel, where N>M>1; and fountain decoding the M of N different portions of the fountain encoded data stream to provide a decoded data stream enabling reception of a service.

12. The method of claim 11, wherein the primary channel conveys at least one high definition TV (HDTV) channel.

13. The method of claim 12, wherein the primary channel represents an ATSC-DTV (Advanced Television Systems Committee-Digital Television) signal.

14. The method of claim 11 comprising:

combining the M of N different portions of the fountain encoded data stream to provide the fountain encoded data stream, wherein fountain decoding includes decoding the fountain encoded data stream to provide the decoded data stream.

\* \* \* \* \*